US009667687B2

(12) United States Patent
Lv

(10) Patent No.: US 9,667,687 B2
(45) Date of Patent: May 30, 2017

(54) GENERATING PROCESSED WEB ADDRESS INFORMATION

(71) Applicant: Alibaba Group Holding Limited, George Town (KY)

(72) Inventor: Hao Lv, Hangzhou (CN)

(73) Assignee: Alibaba Group Holding Limited (KY)

( * ) Notice: Subject to any disclaimer, the term of this patent is extended or adjusted under 35 U.S.C. 154(b) by 891 days.

(21) Appl. No.: 13/659,286

(22) Filed: Oct. 24, 2012

(65) Prior Publication Data

US 2013/0103771 A1     Apr. 25, 2013

(30) Foreign Application Priority Data

Oct. 25, 2011   (CN) .......................... 2011 1 0328436

(51) Int. Cl.
| G06F 15/16 | (2006.01) |
|---|---|
| H04L 29/08 | (2006.01) |
| G06F 17/30 | (2006.01) |

(52) U.S. Cl.
CPC ........ H04L 67/02 (2013.01); G06F 17/30876 (2013.01)

(58) Field of Classification Search
CPC ... H04L 29/08; H04L 67/02; G06F 17/30876; G06F 15/16
USPC .......................................... 709/206; 705/319
See application file for complete search history.

(56) References Cited

U.S. PATENT DOCUMENTS

| 8,355,990 B2 | 1/2013 | Toutonghi | |
|---|---|---|---|
| 2001/0037262 A1* | 11/2001 | Seto | G06Q 30/06 705/26.35 |
| 2004/0203903 A1* | 10/2004 | Wilson | H04W 64/00 455/456.1 |
| 2005/0021649 A1* | 1/2005 | Goodman | G06F 21/316 709/207 |
| 2008/0256602 A1* | 10/2008 | Pagan | H04L 12/581 726/3 |
| 2009/0197681 A1* | 8/2009 | Krishnamoorthy | A63F 13/12 463/42 |
| 2009/0282052 A1* | 11/2009 | Evans | G06F 17/30887 |
| 2010/0057859 A1* | 3/2010 | Shen | G06Q 10/107 709/206 |
| 2010/0198678 A1* | 8/2010 | Burst | G06Q 30/0239 705/14.39 |
| 2010/0299276 A1* | 11/2010 | Shahine | G06Q 50/01 705/319 |
| 2011/0196716 A1* | 8/2011 | Srinivasan | G06Q 30/0201 705/7.29 |

(Continued)

FOREIGN PATENT DOCUMENTS

| CN | 101415010 | 4/2009 |
|---|---|---|
| CN | 101945128 | 1/2011 |
| CN | 102111454 | 6/2011 |

*Primary Examiner* — John Macilwinen
*Assistant Examiner* — Ishrat Rashid
(74) *Attorney, Agent, or Firm* — Van Pelt, Yi & James LLP

(57) ABSTRACT

Generating processed web address information is disclosed, including: receiving a request to share a webpage, wherein the request includes at least a first web address information associated with the webpage and user identification information associated with a first user; generating a second web address information based at least in part on the first web address information and the user identification information associated with the first user; and presenting the second web address information.

24 Claims, 10 Drawing Sheets

(56) References Cited

U.S. PATENT DOCUMENTS

| | | |
|---|---|---|
| 2011/0251895 A1 | 10/2011 | Bladel |
| 2011/0258050 A1* | 10/2011 | Chan .................. G06Q 30/0269 |
| | | 705/14.66 |
| 2012/0290308 A1 | 11/2012 | Detwiller et al. |
| 2012/0324027 A1 | 12/2012 | Vaynblat et al. |
| 2012/0331108 A1 | 12/2012 | Ferdowsi et al. |
| 2013/0046839 A1* | 2/2013 | Ransom .................. G06Q 30/02 |
| | | 709/206 |

\* cited by examiner

GENERATING PROCESSED WEB ADDRESS INFORMATION

CROSS REFERENCE TO OTHER APPLICATIONS

This application claims priority to People's Republic of China Patent Application No. 201110328436.X entitled WEB ADDRESS INFORMATION PROVIDING AND SHARING METHOD, FRIEND ADDING METHOD AND EQUIPMENT THEREFOR filed Oct. 25, 2011 which is incorporated herein by reference for all purposes.

FIELD OF THE INVENTION

The present application relates to the field of communications technology. In particular, it relates to techniques for enabling sharing of web address information between users and establishing friendships between users.

BACKGROUND OF THE INVENTION

Sometimes while a user is browsing a website, the user may discover some web content that interests him and that he wishes to share with others. For example, the user may send a link associated with the web content to a contact via an instant message service. Or the user may share the link at his microblog or blog. When other users see the link shared by the user, the other users may select the link to check out the associated web content. Specifically, for example, a user may be browsing an e-commerce website and come across a webpage of a product that he is interested in. The user may share the link to this webpage at his personal blog. Readers of his blog may see the published link and select it to also browse the product information included in the webpage.

Via such online sharing, the sharing user and the user that selects the shared link may find that they are both interested in the web content at the shared link. As such, the users may have common interests. It would be desirable to connect the two users via a website-recognized friendship so that the users may easily find the other to share information with in the future.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Generating processed web address information is described herein. In various embodiments, a first web address information that is desired to be shared by a first user is processed into a second web address information. In some embodiments, the first web address information is processed into the second web address information based at least in part on user identification of the first user. In some embodiments, the second web address information may be shared (e.g., published, displayed), for example, at a website (e.g., a microblog, a blog, a social networking platform) or via a client application such as an instant messaging application. In some embodiments, in response to a selection associated with a second user of the second web address information, the second web address information is configured to cause a friendship relationship to be established between the first user and the second user.

Figure 1:
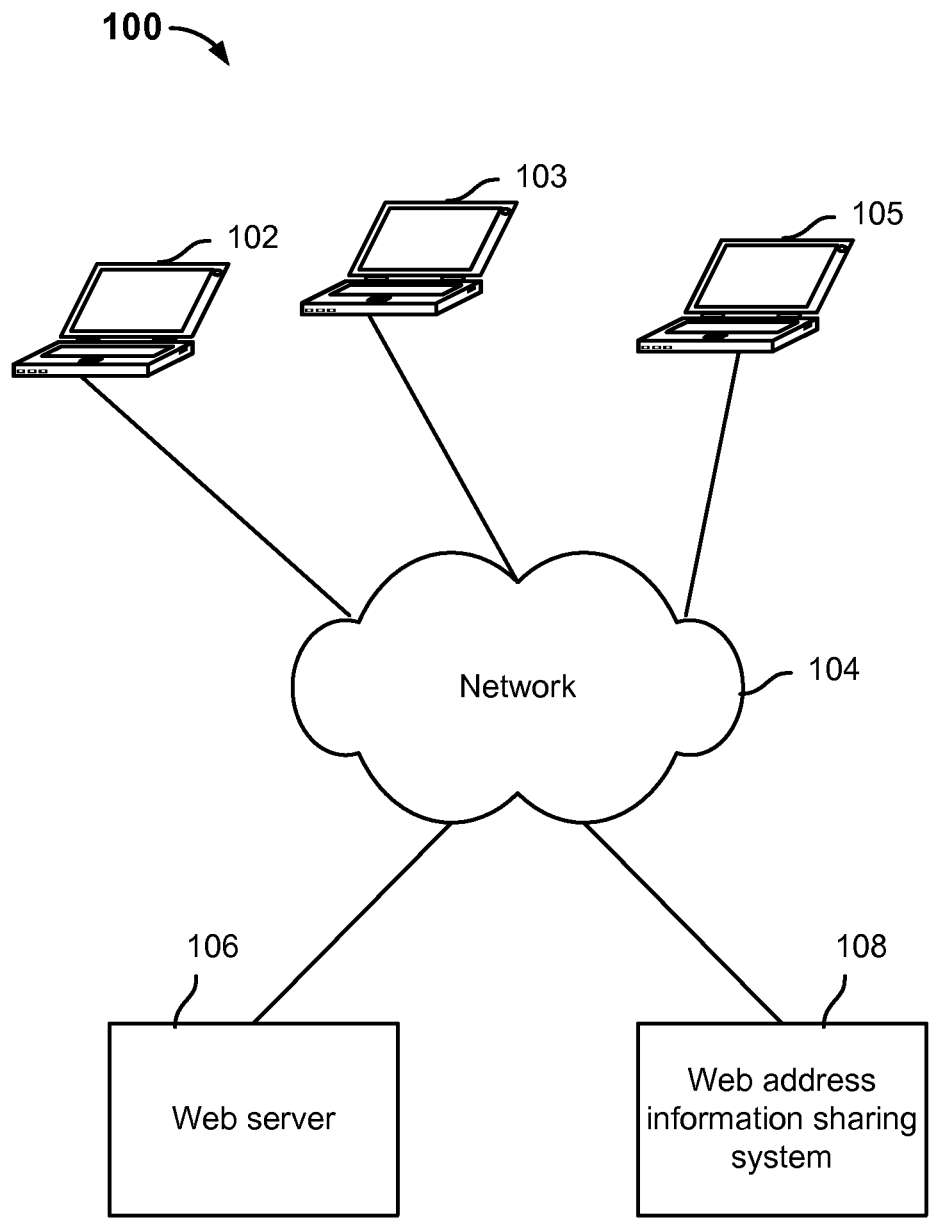
FIG. 1 is a diagram showing an embodiment of a system for generating processed web address information.

FIG. 1 is a diagram showing an embodiment of a system for generating processed web address information. In the example, system 100 includes clients 102, 103, and 105, network 104, web server 106, and web address information system 108. Network 104 may include high speed data networks and/or telecommunications networks.

Clients 102, 103, and 105 are configured to communicate with web server 106 and web address information sharing system 108 over network 104. While clients 102, 103, and 105 are each shown to be a laptop, other examples of clients 102, 103, and 105 include a desktop computer, a smart phone, a mobile device, a tablet, or any other computing device. A client application such as a web browser application may be installed at each of clients 102, 103, and 105 to enable users using the clients to browse through webpages. For example, a first user may use client 102 to access different webpages associated with a website hosted by web server 106. A second may use client 103 to access different webpages associated with a website hosted by web server 106. Furthermore, a third user may use client 105 to access different webpages associated with a website hosted by web server 106. For example, the website may comprise an e-commerce website at which a user may sell or buy products. In some embodiments, user identification information associated with registered users of the website is stored at web server 106. In some embodiments, the website supported by web server 106 includes social networking features that enable two users who are registered at the website to become friends with each other. Users who are friends at the website may be able to enjoy certain features of the website that may otherwise not be available to users of the website who are not friends with each other. For example, users who are friends at the website may be able to share information with each other through social network features such as posting on each other's profiles, private messaging, and instant messaging. For example, the first user that uses client 102 may become friends at the website with the third user that uses client 105 and so the first user and the third user may be able to communicate and share things with each other over the website.

Web address information sharing system 108 is configured to enable a user at clients 102, 103, and 105 to share web address information associated with a webpage. In some embodiments, a first user at client 102 may visit a webpage associated with web server 106 that he desires to share with other users. In some embodiments, the webpage content may be identified and accessed by its web address information (e.g., link, URL). In some embodiments, a request to share the web address information is sent by client 102 (e.g., in response to the first user's selection that he would like to share web address information) to web address information sharing system 108. For example, the request includes the web address information of the webpage that the first user wished to share and identification information associated with the first user. In response to receiving the request, web address information sharing system 108 is configured to generate a new web address information based at least in part on the web address information and the first user identification information included in the request. In some embodiments, web address information sharing system 108 is configured to present the generated web address information to the first user at client 102 so that the first user may copy and publish/share the web address information (e.g., through email, publish at a blog, publish at a microblog) with other users. In some embodiments, web address information sharing system 108 is configured to automatically share the generated web address information on behalf of the first user by publishing/sharing the generated web address information based on a type of sharing selected by the first user (e.g., a type of sharing may include directly posting the generated web address information to the first user's blog).

Web address information sharing system 108 is also configured to enable users (e.g., registered users) associated with the website hosted by web server 106 to becomes friends with each other. For example, a second user that uses client 103 may see the shared generated web address information on the first user's blog and click on it. In response to the second user clicking on the shared generated web address information, an indication associated with an access by the second user to the generated web address information is sent by client 103 to web address information sharing system 108. In response to the indication, client 103 is configured to access from web server 106 the webpage content of the web address information on which the generated web address information (e.g., the webpage that the first user desired to share) was based and web address information sharing system 108 is configured to extract the user identification of the first user from the generated web address information. In some embodiments, web address information sharing system 108 is configured to send an add-friend prompt message to the second user to invite the second user at client 103 to add the first user as a friend, where the prompt message includes a control associated with confirming adding the first user as a friend. In the event the second user activates the control of the prompt message, the web address information sharing system 108 is configured to communicate to web server 106 that the first user is to be added as a new contact to the friends list of the second user.

In some embodiments, web server 106 and web address information sharing system 108 are included in the same system and/or controlled by the same party. In some embodiments, logic/computer code is stored locally at client 102 such that client 102 is enabled to perform at least some of the functions, such as those described above, of web address information sharing system 108.

Figure 2:
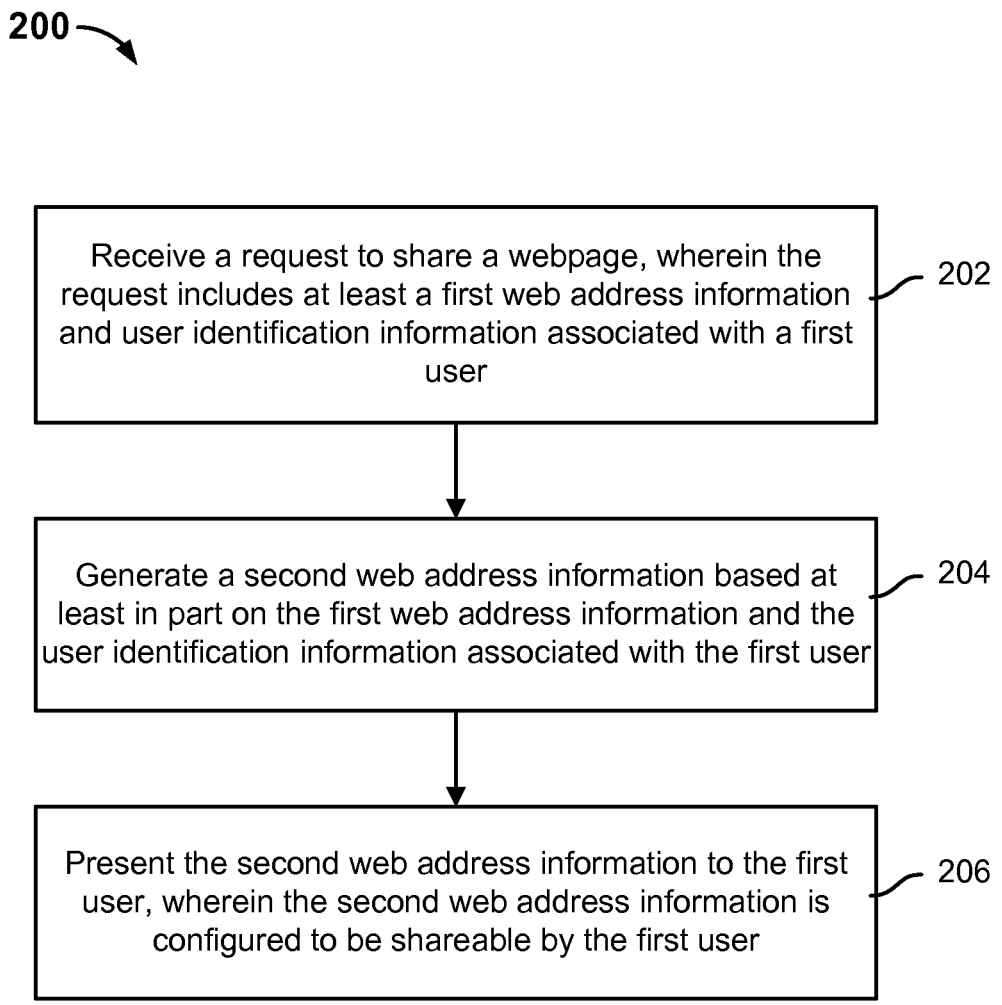
FIG. 2 is a flow diagram showing an embodiment of a process for generating processed web address information.

FIG. 2 is a flow diagram showing an embodiment of a process for generating processed web address information. In some embodiments, process 200 may be implemented at a system such as system 100.

Process 200 may be used to generate a processed web address information based at least in part on user identification associated with a user and then the user may share the processed web address information with other users.

At 202, a request to share a webpage is received, wherein the request includes at least a first web address information associated with the webpage and user identification information associated with a first user.

As a first user browses various webpages of a website using a web browser application, he may come across a webpage that he wishes to share with others. In some embodiments, a button associated with sharing web address information may be present at certain webpages of the website such that when a user wishes to share the webpage, the user may select the button. In some embodiments, the button is presented by the website of the webpage that the first user is browsing. In response to the user's indication to share the webpage (e.g., selection of the button), a request may be sent on behalf of the user. In some other embodiments, each time that a user visits a webpage of such a specially configured website, a request may be automatically issued on behalf of the user. The request may include at least web address information (e.g., the URL) associated with the webpage and user identification information associated with the first user. For example, the user identification information of the first user may be, but is not limited to, the logon name information of the first user at the website which the webpage is associated. For example, a registered user at the website may have logon name and/or password identification information stored with the website. For example, the identification information of a user may indicate and/or be linked with the user's account information, which may include the user's user ID number, the user's buyer credit score (e.g., a value that is based on the number of times that the user has purchased products at the website and the number of times that the user has submitted feedback on purchased products), whether the user has opened any online shops at the website, and which other users are the user's friends at the website (e.g., which other users are included on the user's friends list).

In some embodiments, time information associated with the request is also included in the request. For example, the time information may be associated with when the request was made.

At 204, a second web address information is generated based at least in part on the first web address information and the user identification information associated with the first user.

In some embodiments, the first web address information is processed to generate the second web address information. In some embodiments, the generated second web address information is based at least in part on a combination of the user identification information associated with the first user and the first web address information. In some embodiments, in addition to the user identification information of the first user and the first web address information, the generated second web address information is also based at least in part on the time information associated with the request and/or digital signature information associated with the first user. For example, the digital signature information may be determined based on user identification information of the first user by performing a hash function on the user identification information.

At 206, the second web address information is presented to the first user, wherein the second web address information is configured to be shareable by the first user.

Instead of presenting the first web address information (i.e., original web address information associated with the webpage) to the user, the second web address information is presented to the user. For example, if the request was prompted by the first user's selection of a share button, then the second web address information may be presented in a pop up frame. Or for example, if the request was automatically issued on behalf of the first user due to the first user's visit of the webpage, then the second web address information may be presented within the navigation bar/address field of the web browser application that the first user was using (while the web browser also displays the content of the webpage associated with the first web address information). After the generated second web address information is presented to the first user, the first user may copy and share the second web address information at another webpage (e.g., a blog or microblog or social networking platform) or via a messaging system (e.g., an email or an instant message system). A second user may then view the shared second web address information and select it to be taken to the webpage that the first user desired to share with others.

Even though the second web address information is based on the first web address information in combination with other information (e.g., user identification information associated with the first user), when the second web address information is selected by a second user, the web browser still accesses the webpage referenced by the first web address information as if the second user had directly selected the first web address information. In some embodiments, due to the additional information included in the second web address information, a user selection of the second address information will trigger a process for establishing friendship between the first user and the second user.

In some embodiments, the website of process 200 comprises an e-commerce website. For example, at such an e-commerce website, the first user may be a party associated with a product transaction. For example, the status of the first user could be that of a buyer or of a seller at the e-commerce website. To prevent users whose status is that of seller from publishing advertisements and establishing friendships with buyer-status users (because the activity of seller-status users may attempt to take advantage or harass potential buyer-status users at the website), in some embodiments, prior to generating a second web address information for the first user, it is first checked at the stored user identification information at the e-commerce website for whether the first user has a status of seller. If the first user does have a status of seller, then the first web address information is not published and the first user is prevented from sharing processed web address information. Otherwise, if the first user does not have the status of seller but rather of buyer or a new user who has not participated in transactions, then the first web address information is processed and the second web address information is generated.

The following is one example technique for checking the seller or buyer status of the first user: the user identification information of the first user may be retrieved from a storage/database associated with the e-commerce website. For example, such user identification information may include buyer credit score information and information associated with any shops set up at the e-commerce website. Based on the user identification, if it is determined that the first user has a buyer credit score above a preset threshold credit score value, and also, if no shop information is found for the first user (i.e., the first user has not opened a shop on the e-commerce website), then it is determined that the status of the first user is that of buyer. However, if it is determined that the first user has a buyer credit score below the preset threshold value, and/or the first user has opened at least one shop at the e-commerce website, then it is determined that the status of the first user is that of seller.

Figure 3:
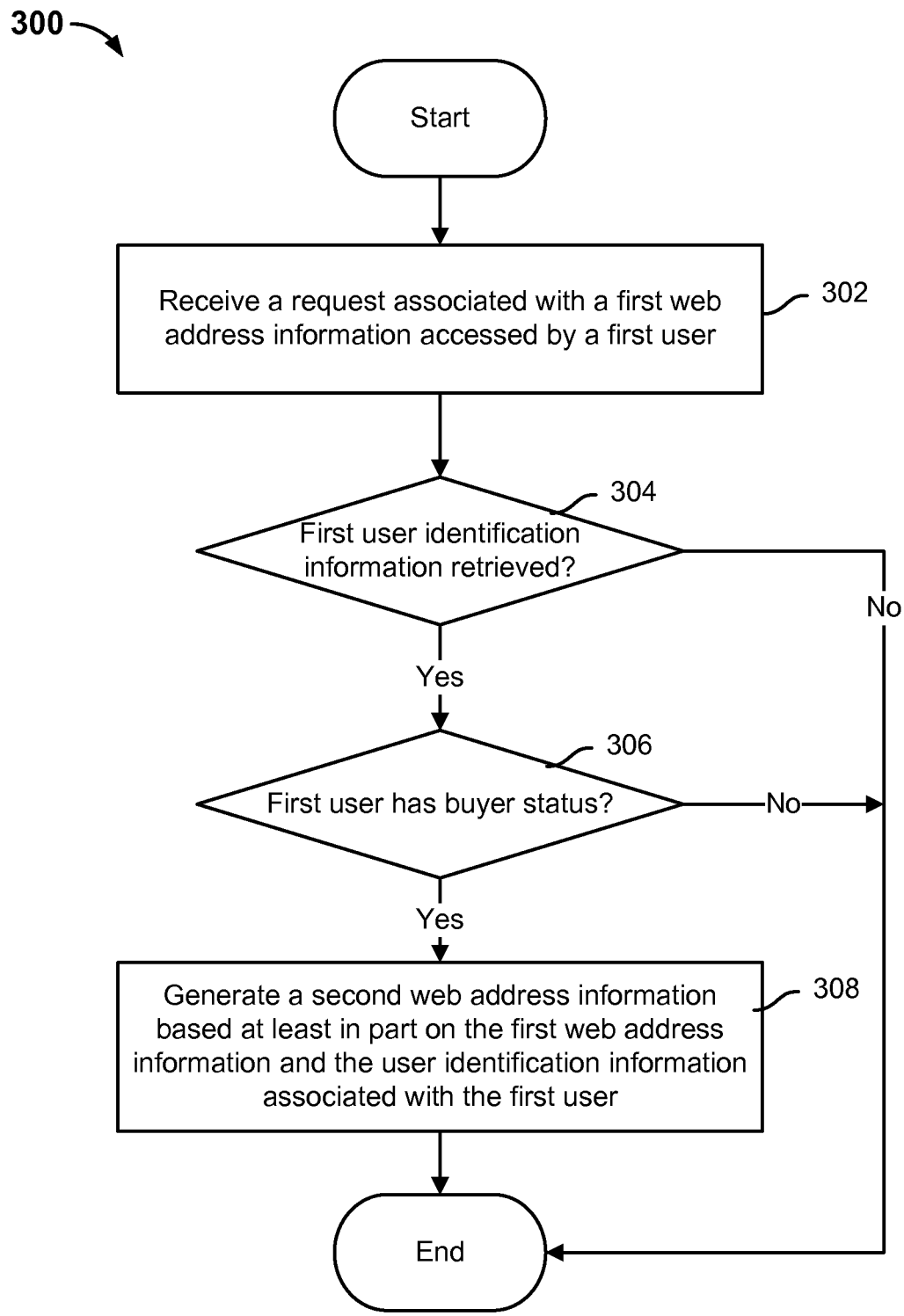
FIG. 3 is a flow diagram showing an example of a process for generating processed web address information.

FIG. 3 is a flow diagram showing an example of a process for generating processed web address information. In some embodiments, process 200 may be implemented using a process such as process 300.

Process 300 illustrates an example of sharing web address information associated with an e-commerce website. At an e-commerce website, certain webpages may include product information associated with products that are for sale (e.g., by users).

At 302, a request associated with a first web address information associated with a webpage accessed by a first user is received. For example, a first user may visit a webpage of the e-commerce website while browsing the website and indicates a desire to share the webpage address. For example, the request may be issued due to the first user's selection of a button associated with sharing that is presented by the website or the request may be automatically sent out on behalf of the first user by virtue of the first user's access to the webpage. In some embodiments, the request to generate a processed web address information may be generated and sent by the client device's web browser application. The following are four examples of original web address information and where each comprises an original link to a specific webpage with product information:

```
http://item.taobao.com/item.htm?id=8789467987
http://item.taobao.com/auction/item_detail.htm?item_num_id=
  8789467987
http://item.tmall.com/item.htm?id=8789467987
http://item.lp.taobao.com/item.htm?item_id=8789467987
```

At 304, it is determined whether user identification information associated with the first user may be retrieved. For example, a database of user identification information associated with registered users of the e-commerce website may be maintained for the e-commerce website. If a set of user identification for the first user cannot be retrieved, then the process ends. Otherwise, control passes to 306.

For example, the user identification information of the first user may be retrieved from a database associated with the e-commerce website if the first user is logged on to the e-commerce website while browsing the e-commerce website. However, if the first user is not logged on to the e-commerce website while browsing the e-commerce website, the user identification information of the first user may be still obtained by using historical logon and/or password information stored by the web browser (e.g., cookie information) regarding the first user's previous accesses to the e-commerce website (e.g., the first user may have previously used the web browser to logon to the e-commerce website and so any such historical information stored by the web browser may be used to look up identification information of the first user at the e-commerce website).

At 306, it is determined whether a status of the first user is associated with a seller or a buyer based at least in part on the retrieved user identification information. For example, if the first user is determined to be a seller, then the process ends. However, if the first user is determined to be a buyer, then control passes to 308.

For example, the first user's buyer credit score and shop information may be determined from the retrieved identification information of the first user. If the first user's buyer credit score is greater than a preset threshold value and if no shop information is found for the first user, then it is determined that the status of the first user at the e-commerce website is that of buyer. Otherwise, it is determined that the status of the first user at the e-commerce website is that of seller and the process ends.

At 308, a second web address information is generated based at least in part on the first web address information and the user identification information associated with the first user.

In some embodiments, a digital signature may be generated for the first user based on the retrieved user identification information. In some embodiments, time information is determined based on time information that may have been included in the request or based on the current time. In some embodiments, the second web address information is generated based on a combination of the first web address information, the user identification information of the first user, the digital signature, and the time information.

For example, assume that the first web address information of the webpage including product information at the e-commerce website is as follows:

http://item.taobao.com/item.htm?id=8789467987

From the first web address information, it may be determined that the product ID of the product information contained in the webpage is id=8789467987. Also, the current time is t=20110411. After obtaining the first user's identification information at the e-commerce website, userId=140279043, t is added to the userId (e.g., t is appended to the userId), and base 32 conversion is performed on the userId plus t to obtain h=19ppogv. An MD5 hash (md5) may be generated with the following arguments=MD5 (letter i+id+userId+t+encryption key)= b8336751312b10f2788d522d287df33f, where the letter i is the product type value corresponding to the product information described above (this may be obtained from the product ID) and the encryption key is preset. (While an MD5 hash is used in this example, other types of hash techniques may be used instead). For example, the userId length may be used to obtain the mod for userId. The four places following the $mod^{th}$ place in md5 may be cut off to obtain m. In this example, m=3675. Then, u=h+m=19ppogv3675. Then the calculated u may be combined with the first web address information so as to obtain the second web address information. For example, the value computed value (e.g., u in the example) based on the user identification information of the first user, the digital signature, and the time information may be appended to the end of the first web address information. So, the example generated second web address information is as shown below:

http://item.taobao.com/
item.htm?id=8789467987&u=19ppogv3675

Where the second web address information (http://item.taobao.com/item.htm?id=8789467987&u=19ppogv3675) comprises the calculated u (&u=19ppogv3675) appended to the end of the first web address information (http://item.taobao.com/item-.htm?id=8789467987).

Once a second user selects the second web address information (http://item.taobao.com/item.htm?id=8789467987&u=19ppogv3675) that may be published at a website, the web browser will access the webpage content associated with the first web address information (http://item.taobao.com/item.htm?id=8789467987) and use the remaining values (&u=19ppogv3675) to establish a friendship at the website between the first user and the second user.

Figure 4:
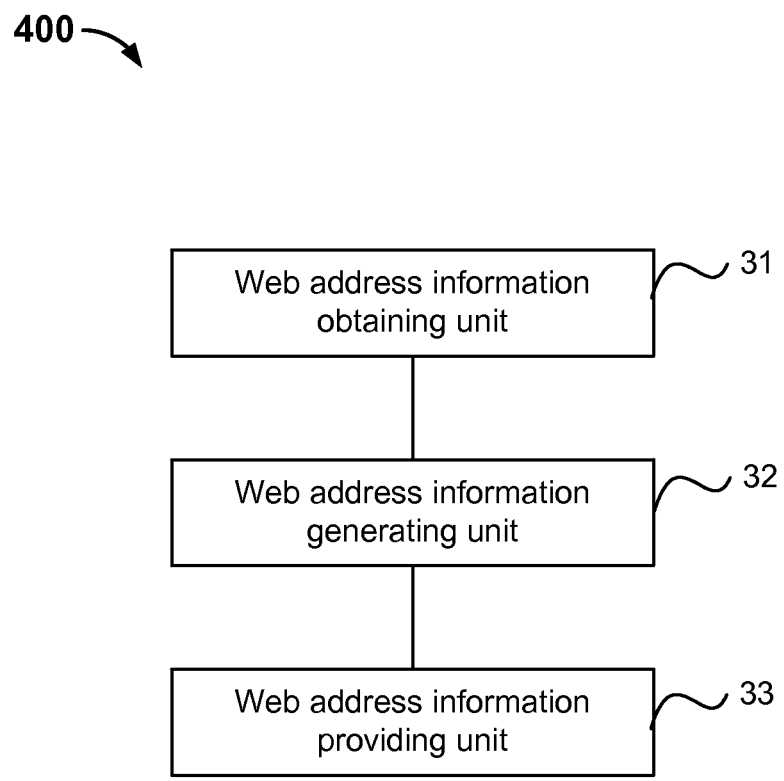
FIG. 4 is a diagram showing an embodiment associated with a system for generating processed web address information.

FIG. 4 is a diagram showing an embodiment associated with a system for generating processed web address information. In some embodiments, processes 200 and 300 may be implemented at a system such as system 400. System 400 includes web address information obtaining unit 31, web address information generating unit 32, and web address information providing unit 33.

The units can be implemented as software components executing on one or more processors, as hardware such as programmable logic devices and/or Application Specific Integrated Circuits designed to perform certain functions, or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices.

Web address information obtaining unit 31 is configured to receive a request to share a webpage, where the request includes a first web address information and user identification information associated with the first user.

Web address information generating unit 32 is configured to generate a second web address information based at least in part on the first web address information and user identification information associated with the first user.

Web address information providing unit 33 is configured to present the second web address information to the first user so that the first user may optionally share the second web address information with other users.

Figure 5:
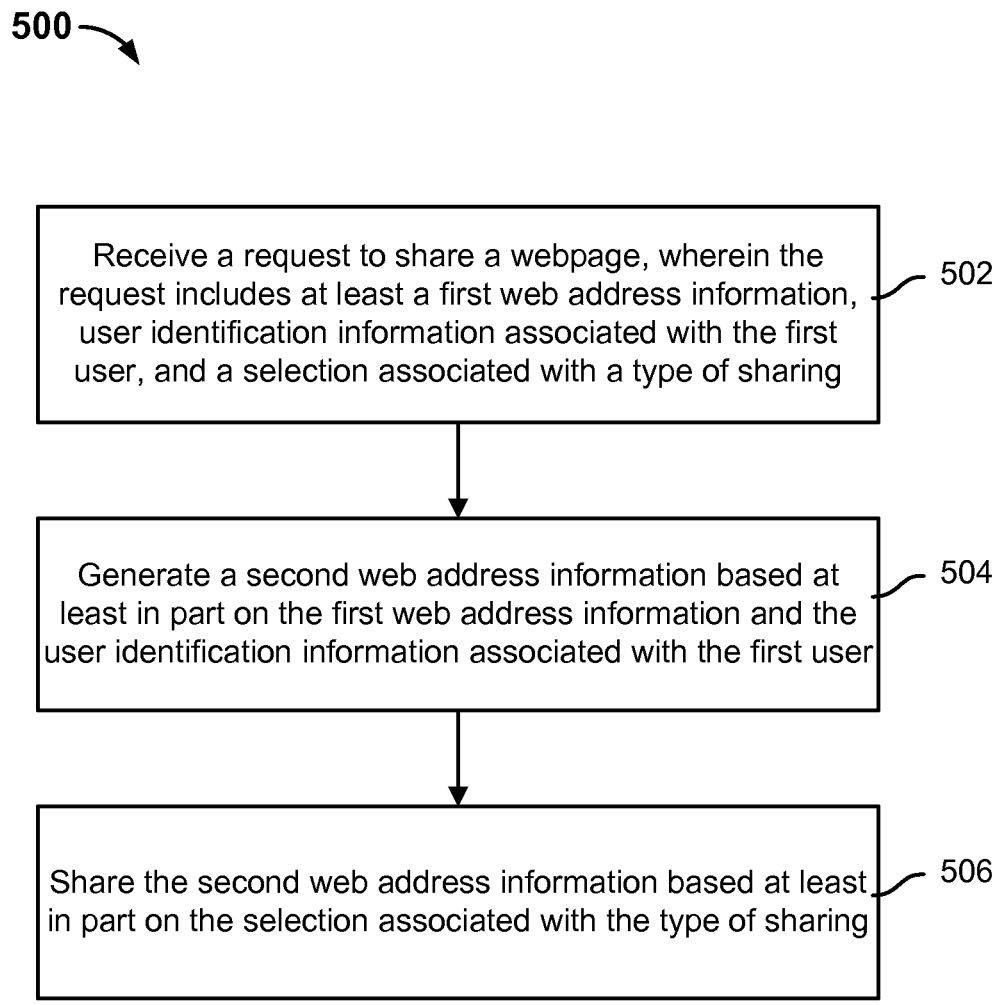
FIG. 5 is a flow diagram showing another embodiment of a process for generating processed web address information.

FIG. 5 is a flow diagram showing another embodiment of a process for generating processed web address information. In some embodiments, process 500 may be implemented at system 100.

Process 500 may be used to generate a processed web address information based at least in part on user identification associated with a user and then the processed web address information may be automatically shared on behalf of the user in a sharing manner selected by the user.

At 502, a request to share a webpage is received, wherein the request includes at least a first web address information associated with the webpage, user identification information associated with the first user, and a selection associated with a type of sharing. A first user may come across a webpage that he wishes to share with others. In some embodiments, the first user may indicate the desire to share the webpage by selecting a button associated with a request to share. In some embodiments, the first web address information associated with the webpage is presented by the web browser at its navigation/address field. In some embodiments, a specific type of sharing is selected by the first user from multiple available types of sharing in association with the request to share. For example, multiple options for types of sharing may be presented to the first user, such as sharing via a blog, via an instant message, via a social network platform, and via a microblog. Prior to sending the request, the first user may be prompted to confirm the completion of the request.

In some embodiments, the request may also include a user inputted text associated with the webpage corresponding to the first web address information. The first user may be prompted to describe or provide comments on the content of the webpage to be shared. Such user inputted text associated with the webpage may be included in the request as well.

For example, the webpage that the first user wants to share is a webpage at an e-commerce website. The product corresponding to the product information included in the webpage is router model no. 123. The first user submitted the following descriptive content in the request to share the webpage: "Router 123, price is 170 yuan, really quite good, sharing with everyone." Thus, after the first user has confirmed the inputted text, request to share not only includes the first web address information but also the user inputted text associated with the webpage.

At 504, a second web address information is generated based at least in part on the first web address information associated with the webpage and the user identification information associated with the first user. For example, 504 may be implemented similarly to 204 of process 200 of FIG. 2.

At 506, the second web address information is shared based at least in part on the selection associated with the type of sharing.

The second web address information is shared according to the type of sharing that is indicated in the request. For example, if the selected sharing style were associated with sharing at the first user's blog, then the second web address information would be posted at the first user's blog. In some embodiments, credentials of the first user for the websites, blogs, microblog, and social media platforms at which the second web address information is to be shared are stored so that access to such services is available. If the request also includes text inputted by the first user, then the second web address information may be shared with the user inputted text. For example, assume that the text input by the first user is "Router 123, price is 170 yuan, really quite good, sharing with everyone," the generated second web address information is "http://t.cn/h1m8jk," and the type of sharing selected by the first user is sharing at the first user's blog. For example, the second web address information may be processed by a link shortening service to arrive at "http://t.cn/h1m8jk." Therefore, the information published at the first user's blog may be as follows:

"Router 123, price is 170 yuan, really quite good, sharing with everyone; web address is http://t.cn/h1m8jk."

In some embodiments, a second user may access the webpage and also be suggested to befriend the first user via selection of the published second web address information at the first user's blog, as will be described in connection with FIGS. 7 and 8.

Figure 6:
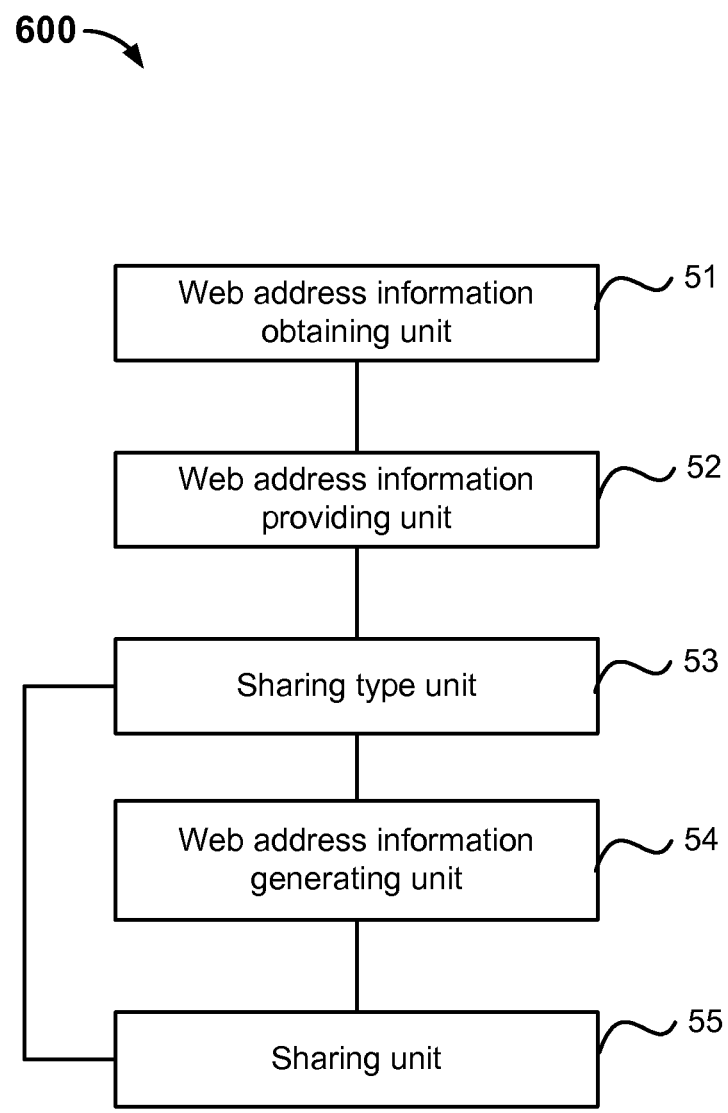
FIG. 6 is a diagram showing another embodiment of a system for generating processed web address information.

FIG. 6 is a diagram showing another embodiment of a system for generating processed web address information. In some embodiments, process 500 may be implemented at system 600. System 600 includes web address information obtaining unit 51, web address information providing unit 52, sharing type unit 53, web address information generating unit 54, and sharing unit 55.

Web address information obtaining unit 51 is configured to receive a request to share a webpage, where the request includes a first web address information associated with a webpage accessed by the first user, user identification information associated with the first user, and a selection associated with a type of sharing.

Sharing type unit 53 is configured to receive a request to share a webpage and identify the selection associated with a type of sharing.

Web address information generating unit 54 is configured to generate a second web address information based at least in part on the first web address information and user identification information associated with the first user.

Sharing unit 55 is configured to share the second web address information based at least on the selection associated with a type of sharing that is identified by sharing type unit 53.

Figure 7:
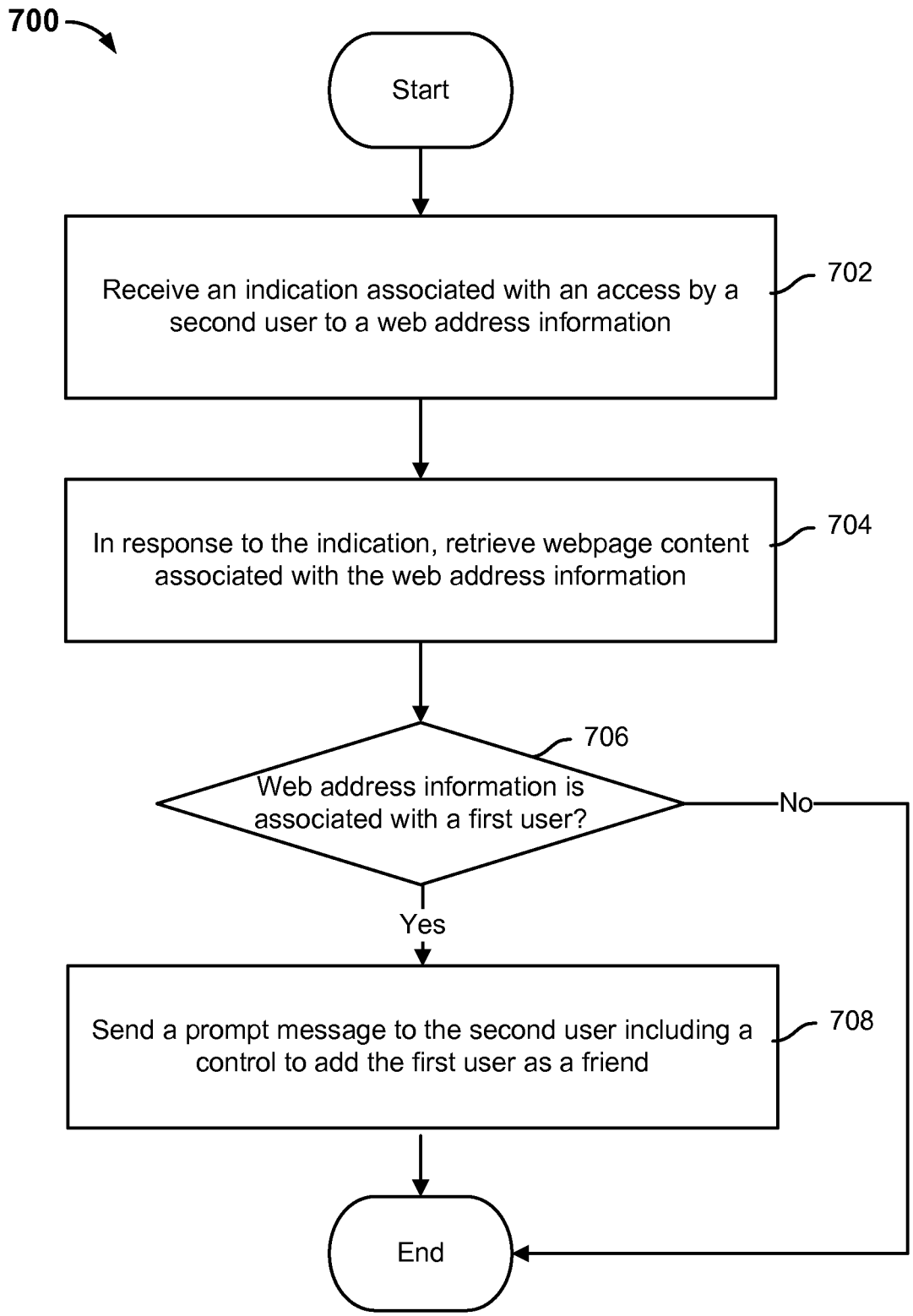
FIG. 7 is a flow diagram showing an embodiment of a process for establishing a friendship between a first user and a second user.

FIG. 7 is a flow diagram showing an embodiment of a process for establishing a friendship between a first user and a second user. In some embodiments, process 700 may be implemented at a system such as system 100.

Process 700 may be implemented after process 200 of FIG. 2 or process 300 of FIG. 3. Process 700 may be used to establish a friendship relationship (e.g., as recognized by a website) between a first user who is associated with sharing web address information and a second user who is associated with accessing the webpage(s) associated with the shared web address information.

At 702, an indication associated with an access by a second user to a web address information is received. The web address information may be shared at a website, social media platform, blog, or microblog, for example, by a first user and may be accessed when a second user that views the published web address information selects (e.g., clicks on) such published web address information.

At 704, in response to the indication, webpage content associated with the web address information is retrieved. The web address information may or may not be processed based on another web address information and includes user identification information of a first user such as the generated second web address information as described by process 200 of FIG. 2 or process 300 of FIG. 3. As mentioned above, a second web address information generated based on a first web address information may be published by a first user at a website. Then, once the second web address information, which is processed to include the first web address information, is selected by the second user, the web browser will access the webpage content associated with the first web address information.

If the web address information is not processed based on another web address information, then it may not include the user identification information of another user.

At 706, it is determined whether the web address information is associated with user identification information associated with a first user.

After the webpage browser used by the second user accesses the webpage content, it is determined whether the web address information includes user identification information associated with a first user (e.g., the first user may comprise a user different from the second user and who may have been responsible for sharing the web address information that the second user selected). If it is determined that the web address information does not include user identification information of the first user, then it is determined that the web address information is not shared by a first user and so a friendship between the second user and another user will not be attempted to be established. Also, the process ends. However, if it is determined that the web address information does include user identification information of the first user, then it is determined that the web address information is shared by the first user and so a friendship between the second user and the first user will be attempted to be established. Also, control passes to 708. In some embodiments, to determine whether the web address information includes user identification information associated with the first user, at least a portion of the web address information may be extracted and examined for data generated based on user identification information. For example, if the web address information were http://item.taobao.com/item.htm?id=8789467987&u=19ppogv3675, then the portion after "&u" may be extracted and examined for the presence of user identification information. For example, the extracted portion may be converted back to the user information on which it was based.

At 708, a prompt message including a control to add the first user as a friend is sent to the second user.

In the event that it is determined that the web address information includes user identification information associated with the first user, a friendship may be encouraged between the first user and the second user because the users may have further common interests that they may more conveniently share with the other once they are established as friends with the other. For example, both the first and second users may be registered at a website such as an e-commerce website that includes a social network component such that different users may be friend each other at the website. For example, users who are friends at the website may be able to have access to each others' contact information that would have otherwise not been available if the users were not friends. Also, for example, users who are friends may enjoy various means of being able to share content with each other such as private messaging at the website, public postings at a user's profile page, and tagging with user's identification information, that they would not otherwise be able to do if the users were not friends.

As such, an add-friend prompt message that asks whether the second user would like to become friends with the first user that shared the web address information is sent to the second user. For example, the add-friend prompt message may appear as a pop-up message that overlays the webpage that the second user is currently browsing with the web browser. A control is also included in the prompt message. In some embodiments, in the event that the second user activates the control (e.g., the control may comprise a confirmation button) in the add-friend prompt message (e.g., by clicking on the control) and thereby confirms the friendship with the first user, the first user is added to the friends list of the second user.

In some embodiments, the friendship between the second user and the first user established due to the second user activating the control of the add-friend prompt message is a one-way friendship. That is to say, because only the second user has agreed to add the first user as a friend and the first user has not explicitly agreed to add the second user as a friend, the second user can still add the first user as a friend to the second user's friends list. This is the equivalent of the second user sending a friend-added confirmation message. Once the second user activates the control of the add-friend prompt message, the second user's identification information at the website corresponding to the web address information is obtained. Specifically, for example, it is first determined whether the second user is logged onto the website. If the second user is currently logged on, then the identification information of the second user may be directly obtained from the website. However, if the second user is not currently logged on, then the second user is prompted to log onto the website. After the second user has logged on, the second user's identification information may be obtained from the website. After the second user's identification information is obtained, an add-friend request message is generated. The add-friend request message includes the identification information of the second user and the first user at the website. In processing the add-friend request message, the second user's identification information is used to look up the second user's friends list at the website and then the first user's identification information is added as a new contact to the second user's friends list. In this way, the second user may add the first user as his friend at the website.

In some embodiments, the friendship between the second user and the first user established due to the second user activating the control of the add-friend prompt message is a two-way friendship. That is, the first user and the second user may explicitly add each other as friends. In this case, if the second user confirms adding the first user as a friend, which is equivalent to sending a friend-added confirmation message, the second user's identification information at the website is obtained and then an add-friend request message is generated. The add-friend request message includes the website's identification information of the second user and the first user. In processing the add-friend request message, the second user's identification information is used to look up the second user's friends list at the website and then the first user's identification information is added as a new contact to the second user's friends list. Also, the first user's identification information is used to look up the first user's friends list at the website and then the second user's identification information is added as a new contact to the first user's friends list. In this way, the second user and the first user may mutually add each other as friends.

In some embodiments, a first user is not added as a friend to the second user until express confirmation is received from the first user. After the second user activates the control of the add-friend prompt message, the first user is sent an add-friend prompt message that asks whether the first user would like to become friends with the second user. A control is also included in the prompt message. For example, this add-friend prompt message may include the second user's identification information. In some embodiments, in the event that the first user activates the control (through a user click by the first user) in the add-friend prompt message, and thereby confirms the friendship with the second user, then a friend-added confirmation message is generated. The second user's identification information is used to look up the second user's friends list and then the first user's identification information is added to the looked up second user's friends list. In addition, the first user's identification information is used to look up the first user's friends list and the second user's identification information is added to the first user's friends list. In this way, the second user and the first user may mutually add each other as friends.

In some embodiments, prior to sending the prompt message to the second user to add the first user as a friend, a check may be performed for whether the webpage that the second user was previously browsing is associated with domain name information that corresponds to domain name information associated with the web address information that the second user was trying to access. If the two domain name information matches, i.e., the previous webpage and the webpage linked by the web address information are associated with the same website, that indicates that the second user did not visit the webpage through the web address information shared by the first user. In this event, an add-friend prompt message regarding adding the first user as a friend is not sent to the second user. If the two domain name information do not match, i.e., the previous webpage and the webpage linked by the web address information are not associated with same website, that indicates that the second user did visit the webpage through the web address information shared by the first user. In this event, an add-friend prompt message regarding adding the first user as a friend is sent to the second user.

In some embodiments, the web address information shared by the first user may be associated with time limit requirements, i.e., the processed web address information shared by the first user will not trigger an attempt to establish a friendship between the first user and the second user after a preset period of valid sharing time has passed. For example, after it is determined that the web address information includes the first user's identification information and before the add-friend prompt message is sent to the second user, time verification may be performed on the first the web address information. In performing time verification, time information associated with the request may be extracted from the web address information and then it is determined whether the preset period of valid sharing time has passed since the time indicated by the extracted time information. If more than the preset period of valid sharing time has passed since the time indicated by the extracted time information, then the processed web address information shared by the first user has expired and access to the processed web address information will no longer trigger an attempt to establish a friendship between the first user and the second user. However, user selection of the web address information will still cause the web browser to access the associated webpage content. However, if less than the preset period of valid sharing time has passed since the time indicated by the extracted time information, then the processed web address information shared by the first user has not expired and access to the processed web address information will trigger an attempt to establish a friendship between the first user and the second user and an add-friend prompt message regarding adding the first user as a friend is sent to the second user. This feature may protect the user from interference resulting from expired web address information.

In some embodiments, an activation assessment may be performed to determine whether a friendship is eligible to be established between the first user and the second user. In some embodiments, the activation assessment includes determining whether a digital signature included in the web address information associated with the first user can be verified. In some embodiments, the activation assessment may be performed before the add-friend prompt message is sent to the second user. In some embodiments, during the activation assessment, a digital signature that is included in the web address information may be extracted. As mentioned above, the digital signature may be generated based on user identification associated with the first user. In some embodiments, the digital signature may be converted back to the user identification information on which it was based. In some embodiments, if the digital signature was generated using an irreversible hash, then a hash dictionary may be used to obtain the information on which the digital signature was based. Then, this user identification information is compared to the first user's identification information that was determined from the processed web address information. If there is a match, then the activation is successful and the add-friend prompt message regarding adding the first user as a friend is sent to the second user. But if there is not a match, then the activation fails, the digital signature information is determined to be counterfeit or expired, and the add-friend prompt message regarding adding the first user as a friend is not sent to the second user.

In some embodiments, it may be determined whether the first user and the second user are already friends with each other at the website. To perform this determination, the first user's identification information and the second user's identification information are used. The first user's identification information is derived from the web address information. The second user's identification information may be the identification information of the second user that is stored by the website or it may be the identification information stored by the second user's web browser based on the second user's previous visit(s) to the website. If the second user is not currently logged onto the website, the second user's second user identification information that is used to perform the determination is the historical identification information stored by the webpage browser. If the second user is already logged onto the website, the second user's second user identification information that is used to perform the determination is the second user's identification information stored by the website. However if the historical identification information stored by the webpage browser is used, then the activation assessment is performed, including by verifying the digital signature associated with the first user that is included in the web address information. If the the second user's identification information stored by the website is used, then the activation assessment is performed, and it is determined whether the first user is already included in the second user's friends list. If it is determined that the first user is already included in the second user's friends list, then the add-friend prompt message is not sent to the second user (because the first user does not need to be added to the second user's friends list) and the activation assessment automatically fails. But if it is determined that the first user is not already included in the second user's friends list, then the add-friend prompt message regarding adding the first user as a friend is sent to the second user and the activation assessment is performed, including by verifying the digital signature associated with the first user that is included in the web address information.

In some embodiments, it may be determined whether the first user and the second user are the same user at the website. This determination may be performed by comparing the first user's identification information with the second user's identification information and if there is a match, then it is determined that the first user and the second user are the same user at the website and therefore an add-friend prompt message regarding adding the first user as a friend is not sent to the second user. However, if there is not a match, then it may be determined whether the first user is already included in the second user's friends list.

In some embodiments, the website associated with the web address information of process 700 is associated with an e-commerce website. If the website were an e-commerce website, then it may be desired to prevent users with the seller status from establishing friendships with other users with the buyer status (so that the seller users do not bother the buyer users with advertisements and other behavior based on commercial interests). To that end, in some embodiments, after determining that the identification information of the second user and the identification information of the first user on the e-commerce website are not the same, and before determining whether the first user is already on the second user's friends list, it is also possible to determine the status of the second user on the e-commerce website based on the identification information of the second user. If the status of the second user is determined to be seller, then an add-friend prompt message regarding adding the first user as a friend is not sent to the second user. If the status of the second user is determined to be buyer, then it may be determined whether the first user is already included in the second user's friends list.

As mentioned above, in some embodiments, after the digital signature information associated with the first user that is included in the web address information is successfully verified, the activation assessment may be confirmed to be successful. However, in some other embodiments, in order to not provide redundant add-friend prompt messages relating to the same web address information to the second user, the following may be performed after the digital signature information included in the web address information has been successfully verified: a first name list may be maintained for the web address information, where the first name list includes identification information of users at the website for which the web address information has already been successfully activated (e.g., if the second user appears on the first name list, then a friendship between the second user and the first user has already been established via the second user selecting the shared web address information). If the second user's identification information is found on the first name list, then the activation assessment is deemed to have failed. However, if the second user's identification information is not found on the first name list, then the activation assessment is confirmed to be successful and the first name list is updated with the second user's identification information. In some embodiments, in order to restrict the number of times that the same web address information has been activated, before determining whether the second user identification information of the second user is already on the first name list, the number of add-friend prompt messages sent in connection with the web address information (i.e., the number of times that the same web address information has been activated) within a specified time interval is obtained. If the determined amount is greater than a first preset threshold value, then the web address information activation frequency exceeds the maximum number of activations with respect to the web address information and the activation assessment is deemed to have failed. However, if the determined amount is not greater than the first preset threshold value, then the web address information activation frequency has not exceeded the maximum number of activations and it is determined whether the second user's identification information is already on the first name list. If the second user's identification information is already on the first name list, then an add-friend prompt message is not sent to the second user (because the second user has already successfully activated the second web address information).

In some embodiments, in order to not provide redundant add-friend prompt messages relating to the first user to the second user, the following may be performed after the digital signature information associated with the first user included in the web address information has been successfully verified: the friends list of the second user may be obtained and it is determined whether the first user is already included in that list. If the first user is already included in the second user's friends list (i.e., the first user and the second user are friends already), then the activation assessment automatically fails even though the digital signature was successfully verified. But if the first user is not included in the second user's friends list (i.e., the first user and the second user are not yet friends), the activation assessment is confirmed to be successful and the first user is added to the second user's friends list.

In some embodiments, in order to restrict the number of times that the same second user activates any web address information published by another user, a second name list associated with the other users with whose published web address information the second user has already selected/activated is maintained. Before determining whether the user identification information of the first user is already on the second name list, the amount of add-friend prompt messages sent in connection with the second user (i.e., the number of times that the second user has activated web address information published by any user) within a specified time interval is obtained. If the amount is greater than a second preset threshold value, then the second user activation frequency exceeds the maximum number of activations with respect to the second user, and the activation is deemed to have failed. However, if the amount is not greater than a second preset threshold value, then the second user activation frequency does not exceed the maximum number of activations with respect to the second user, and the activation is confirmed to be successful and it is determined whether the first user identification information is already on the second user's list. If the first user's identification information is already on the second name list, then an add-friend prompt message is not sent to the second user (because the second user has already successfully activated the second web address information).

Figure 8:
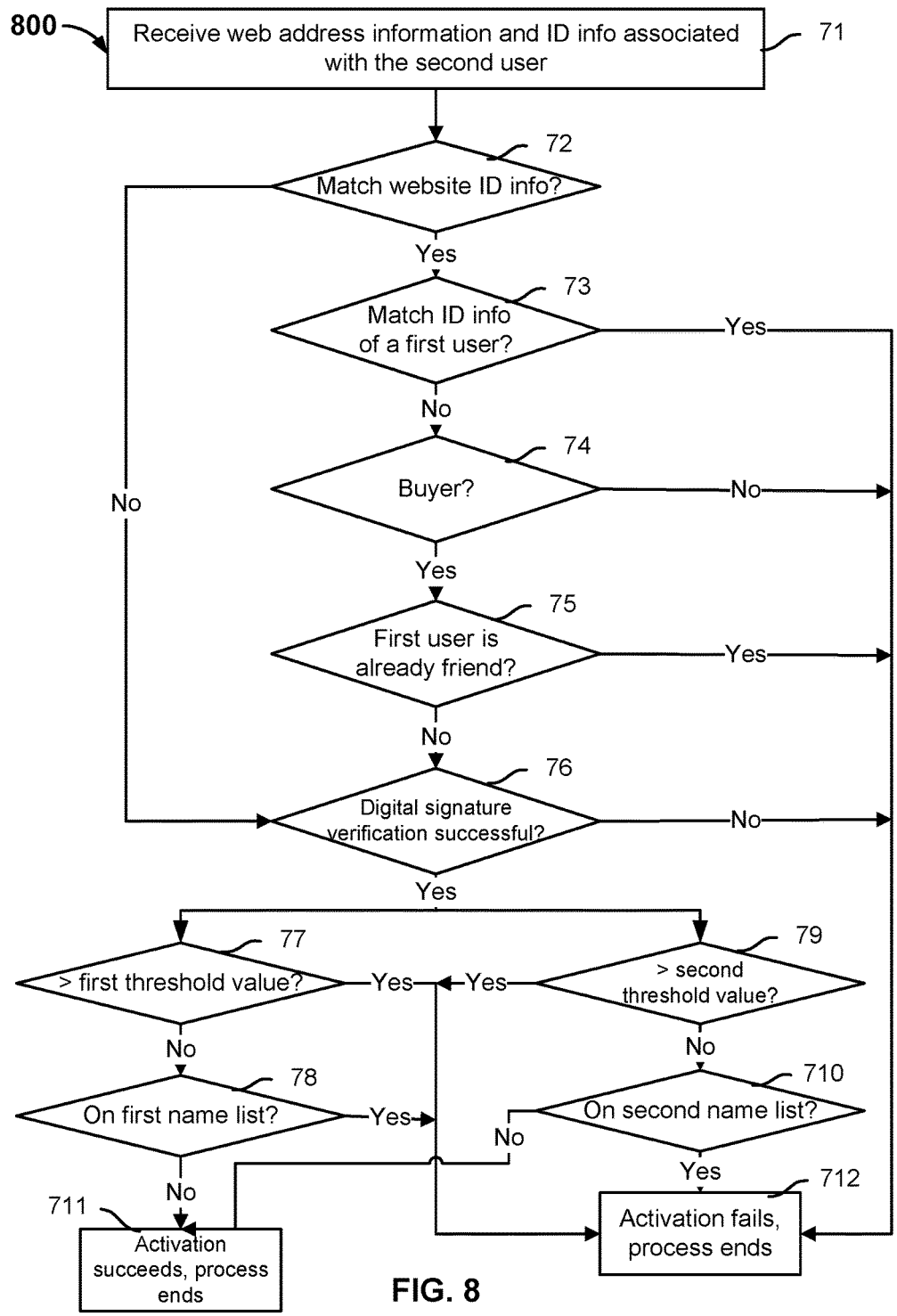
FIG. 8 is a flow diagram showing an example of performing activation for a user who has selected shared web address information.

FIG. 8 is a flow diagram showing an example of performing activation for a user who has selected shared web address information. In some embodiments, at least a portion of the activation assessment of process 500 may be performed using process 800. In the example of process 800, the website associated with the web address information is associated with e-commerce.

At 71, web address information and identification information associated with a second user are received. The information is received when the second user accesses (e.g., clicks on) a web address information that is published at a website. The web address information is associated with an e-commerce website and is shared by a first user. The identification information associated with a second user may be stored by the web browser that is used by the second user.

At 72, it is determined whether the received second user identification information associated with the second user and identification information of the second user retrieved from the e-commerce website match. If the identification information matches, then control passes to 73. If the identification information does not match, then control passes to 76.

At 73, it is determined whether the identification information associated with the second user matches identification information associated with a first user. The first user comprises the user that shared the web address information that the second user selected (e.g., clicked on). If the identification information associated with the second user matches identification information associated with the first user, then the first user and the second user are considered to be the same user and control passes to 712, which indicates that the activation fails and the process ends. But if the identification information associated with the second user does not match the identification information associated with the first user, then the first user and the second user do not comprise the same user and control passes to 74.

At 74, whether the second user has a buyer status is determined based at least in part on the identification information of the second user. If the second user is assessed to have the status of buyer, then control passes to 75. But if the second user is assessed to have the status of seller, then control passes to 712.

At 75, it is determined whether the first user is already included in the second user's friends list based at least in part on the identification information of the second user and the identification of the first user. If it is determined that the first user is already included in the second user's friends list, then control passes to 712. Otherwise, control passes to 76.

At 76, it is determined whether the digital signature information extracted from the web address information can be successfully verified by the first user identification information extracted from the web address information. If the verification is successful, then control passes to 77 and 79. Otherwise, if the verification fails, then control passes to 712.

At 77, it is determined whether an amount of add-friend prompt messages sent in connection with the web address information within a specified segment of time is greater than a first preset threshold value. If the first preset threshold value is exceeded, then control passes to 712. Otherwise, control passes to 78.

At 78, it is determined whether the identification information associated with the second user is already on the first name list, wherein the first name list includes identification information associated with users who have activated the web address information. If it is determined that the identification information associated with the second user is already on the first name list, then control passes to 712. If it is determined that the identification information associated with the second user is not already on the first name list, then control passes to 711.

At 79, it is determined whether an amount of add-friend prompt messages sent in connection with the second user within a specified segment of time is greater than a second preset threshold value. If the first preset threshold value is exceeded, then control passes to step 712. Otherwise, control passes to 710.

At 710, it is determined whether the identification information associated with the first user is already on the second name list, wherein the second name list is associated with the other users with whose published web address information the second user has already selected/activated. If it is determined that the identification information associated with the first user is already on the second name list, then control passes to 712. If it is determined that the identification information associated with the first user is not already on the second name list, then control passes to 711, at which the activation succeeds and the process ends.

At 711, the activation is determined to be successful and the process ends.

At 712, the activation is determined to have failed and the process ends.

As described above, in various embodiments, a first user shares a processed web address information associated with a webpage that the first user desires to share with other users. The shared web address information includes user identification information associated with the first user. A second user may then click on and visit the shared the web address information. The web browser used by the second user may then access and display the webpage content associated with the web address information. In some embodiments, subsequent to the access of the webpage content associated with web address information, it is determined whether the web address information includes the user identification information associated with the first user. If it is determined that the user identification information associated with the user identification information associated with the first user is included, an add-friend prompt message is sent to the second user to invite the second user to add the first user as a new contact in the second user's friends list. If the second user confirms establishing a friendship with the first user (e.g., by adding the first user to the second user's friends list), then the first user and the second user may become friends as recognized by the associated website. As such, the two users will be able to easily communicate with the other at the website via the sharing/communication tools that are available at the website (e.g., instant messaging, sharing via a user's profile, private messaging, etc.).

Figure 9:
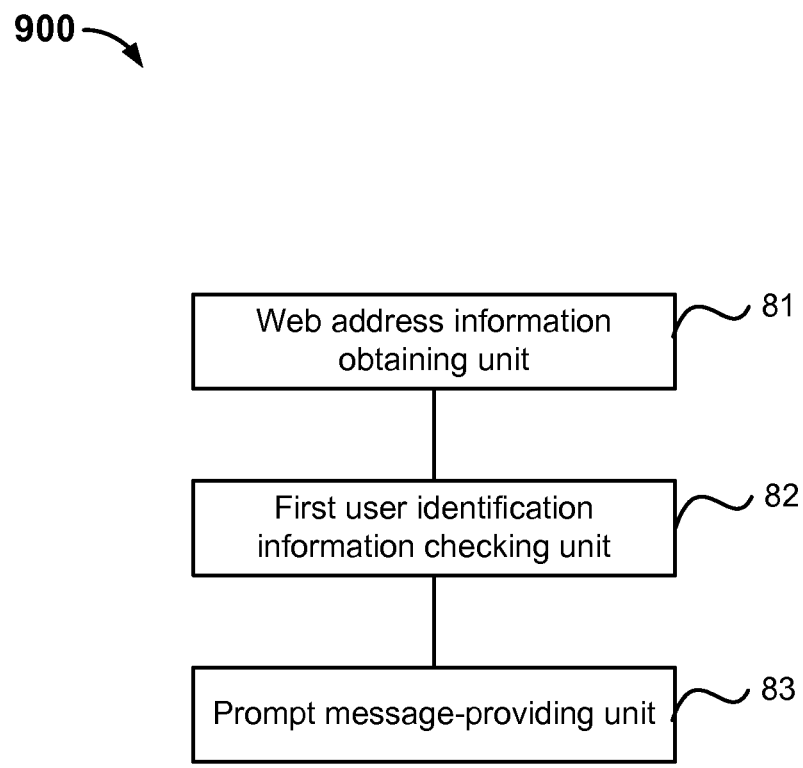
FIG. 9 is a diagram showing an embodiment of a system for enabling sharing of web address information between users.

FIG. 9 is a diagram showing an embodiment of a system for enabling sharing of web address information between users. In the example, system 900 includes web address information obtaining unit 81, first user identification information checking unit 82, and prompt message providing unit 83.

Web address information obtaining unit 81 is configured to determine the web address information corresponding to the webpage that a second user has selected (e.g., clicked on).

First user identification information checking unit 82 is configured to determine whether the web address information obtained by web address information obtaining unit 81 includes the user identification information of the first user.

Prompt message providing unit 83 is configured to receive an indication from first user identification information checking unit 82 that the user identification information of the first user identification is included in the web address information. Prompt message providing unit 83 is also configured to send an add-friend prompt message to the second user, where the prompt message includes a control that when activated is configured to cause the first user associated with the identification information determined from the web address information to be added to the friends list of the second user.

In some embodiments, system 900 further comprises:

A domain name information assessment unit configured to, before prompt message-providing unit 83 has sent the add-friend prompt message to the second user, determine whether the webpage that the second user was previously browsing is associated with domain name information that corresponds to domain name information associated with the web address information that the second user is trying to access. In the event that there is not a match of domain name information, prompt message-providing unit 83 is configured to send the add-friend prompt message to the second user.

In some embodiments, the web address information also includes time information. So, in some embodiments, system 900 may further include:

A time point information extraction unit configured to, before prompt message-providing unit 83 has sent the add-friend prompt message to the second user, extract time information from the web address information obtained by web address information obtaining unit 81.

A time length assessment unit configured to determine whether the length of time passed since the time indicated in the time information extracted from the web address information is greater than a preset valid sharing time length. Prompt message-providing unit 83 is configured to send the add-friend prompt message to the second user in the event that the time length assessment unit determines that the length of time passed since the time indicated in the time information is not greater than the preset valid sharing time length.

In some embodiments, system 900 further includes:

A web address information sending unit configured to, before prompt message-providing unit 83 has sent the add-friend prompt message to the second user, send the web address information to a webpage server corresponding to the web address information, the web address information including the user identification information of the first user and the digital signature information generated on the basis of the user identification information of the first user. In some embodiments, the web address information sending unit is also configured to send the second user's user identification information to the webpage server. For example, the second user's user identification information may be retrieved from the website associated with the web address information or the information stored by the web browser used by the second user.

An instruction message receiving unit configured to receive add-friend instruction messages from the webpage server. Prompt message-providing unit 83 is configured to send the add-friend prompt message to the second user in the event that the instruction message receiving unit receives an add-friend instruction message.

In some embodiments, system 900 further includes:

A confirmation message receiving unit configured to receive add-friend confirmation messages sent by the second user.

An identification information obtaining unit configured to, after the add-friend confirmation message is received by the confirmation message receiving unit, obtain the identification information of the second user on the website corresponding to web address information.

A request message sending unit is configured to send add-friend request messages to the webpage server, where the add-friend request messages include the identification information of the second user and and the identification information of the first user at the website.

Figure 10:
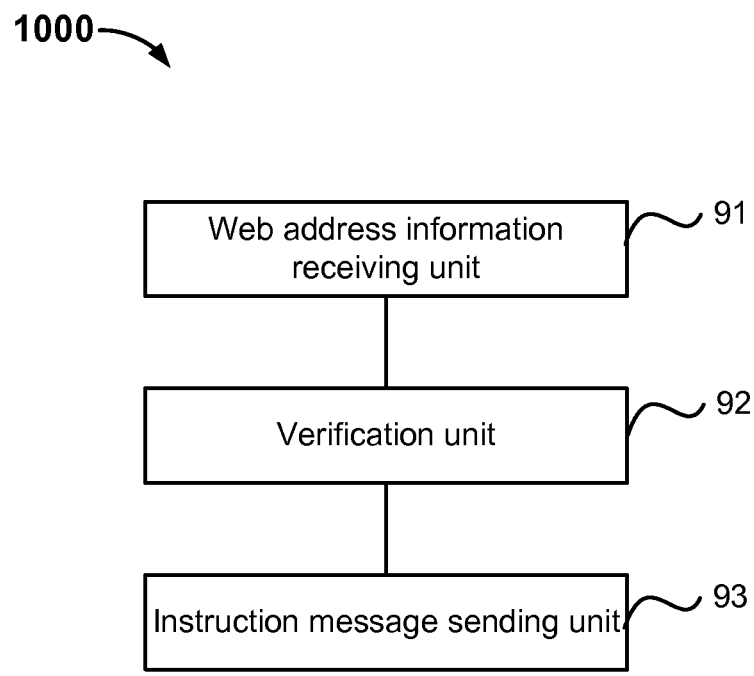
FIG. 10 is a diagram showing another embodiment of a system for enabling sharing of web address information between users.

FIG. 10 is a diagram showing another embodiment of a system for enabling sharing of web address information between users. In the example, system 1000 includes web address information receiving unit 91, verification unit 92, and instruction message sending unit 93.

Web address information receiving unit 91 is configured to determine the web address information corresponding to the webpage that a second user has selected. In some embodiments, the web address information includes user identification information of a first user and the digital signature information generated based on the user identification information of the first user.

Verification unit 92 is configured to use the user identification information of the first user extracted from the web address information to verify the digital signature information extracted in the web address information.

Instruction message sending unit 93 is configured to send an add-friend instruction message after successful verification by verification unit 92.

In some embodiments, web address information receiving unit 91 is configured to receive the web address information, the user identification information of the second user, and the user identification information of the first user that was extracted from the web address information. For example, the second user's user identification information may be retrieved from the website associated with the web address information or from the information stored by the web browser used by the second user.

In some embodiments, system 1000 further includes:

An identification assessment unit configured to, before verification unit 92 verifies the digital signature information included in the web address information, determine whether the received user identification information of the second user matches the identification information of the second user stored at the website corresponding to web address information.

A friends list assessment unit is configured to use the identification information of the second user and the identification information of the first user to determine whether the first user is already included in the second user's friends list. Verification unit 92 is configured to verify the digital signature information extracted from the web address information in the event that the received identification information of the second user and the identification information of the second user stored at the website match and that the first user is not already included in the friends list of the second user.

In some embodiments, system 1000 further includes:

An identification information assessment unit configured to, before the name list assessment unit has assessed whether the first user is already included in the second user's friends list, determine whether the identification information of the second user and the first user are the same on the website. A friends list assessment unit is configured to determine whether the first user is already included in the second user's friends list in the event that the identification information assessment unit determines that the first user and second user are not the same user.

In some embodiments, system 1000 further includes:

First name list obtaining unit is configured to, before the instruction message sending unit sends an add-friend instruction message, obtain the first name list corresponding to the webpage associated with the web address information.

First name list assessment unit is configured to determine whether the user identification information of the second user is already on the first user list.

Instruction message sending unit 93 is configured to send an add-friend instruction message in response to a determination by the first name list assessment unit that the identification information of the second user is not found on the first name list.

In some embodiments, system 1000 further includes:

First message quantity obtaining unit is configured to, before the first name list assessment unit has assessed whether the user identification information of the second user is already included in the second name list, obtain the amount of add-friend instruction messages sent in connection with the web address information within a specified segment of time.

First message quantity assessment unit is configured to determine whether the amount obtained by the first message quantity obtaining unit is greater than a specified threshold value. First name list assessment unit is configured to obtain the amount of add-friend instruction messages sent in connection with the web address information within a specified segment of time in the event that it is determined that the amount obtained by the first message quantity obtaining unit is not greater than a specified threshold value.

In some embodiments, system 1000 further includes:

Second name list obtaining unit is configured to, before the instruction message sending unit sends an add-friend instruction message, obtain the second name list corresponding to the second user.

Second name list assessment unit is configured to determine whether the user identification information of the first user is already on the second name list.

Instruction message sending unit 93 is configured to send an add-friend instruction message when it is determined by the second name list assessment unit that the user identification information of the first user is not already on the second name list.

In some embodiments, system 1000 further includes:

Second message quantity obtaining unit is configured to, before the second name list assessment unit has assessed whether the user identification information of the first user is already on the second name list, obtain the amount of add-friend instruction messages sent in connection with the second user within a specified segment of time.

Second message quantity assessment unit is configured to determine whether the amount obtained by the second message quantity obtaining unit is greater than a specified threshold value. Second name list assessment unit is configured to determine whether the user identification information of the first user is already on the second name list in the event the second message quantity obtaining unit determines the amount obtained by the second message quantity obtaining unit is not greater than a specified threshold value.

In some embodiments, system 1000 further includes:

Add-friend request message receiving unit is configured to obtain add-friend request messages sent, where the add-friend request messages include the identification information of the second user and the identification information of the first user.

Friends list looking up unit is configured to use the identification information of the second user to look up the second user's friends list.

Friend-adding unit is configured to add the identification information of the first user to the second user's friends list.

A person skilled in the art should understand that the embodiments of the present application can be provided as methods, devices (equipment), or computer software products. Therefore, the present application can take the form of embodiments consisting entirely of hardware, embodiments consisting entirely of software, and embodiments which combine software and hardware. In addition, the present application can take the form of computer programs implemented on one or more computer-operable storage media (including but not limited to magnetic disk storage devices, CD-ROMs, and optical storage devices) containing computer program codes.

The present application is described with reference to flow charts and/or block diagrams based on methods, devices (equipment) and computer program products in the embodiments of the present application. It should be understood that each process and/or block in the flow charts and/or block diagrams, and combinations of processes and/or blocks in the flow charts and/or block diagrams, can be achieved through computer program commands. One can provide these computer commands to a general-purpose computer, a specialized computer, an embedded processor or the processor of other programmable data equipment so as to give rise to a machine, with the result that the commands executed through the computer or processor of other programmable data equipment give rise to a device that is used to realize the functions designated by one or more processes in a flow chart and/or one or more blocks in a block diagram.

These computer program commands can also be stored on specially-operating computer-readable storage devices that can guide computers or other programmable data equipment, with the result that the commands stored on these computer-readable devices give rise to products that include command devices. These command devices realize the functions designated in one or more processes in a flow chart and/or one or more blocks in a block diagram.

These computer program commands can also be loaded onto a computer or other programmable data equipment, with the result that a series of operating steps are executed on a computer or other programmable equipment so as to give rise to computer processing. In this way, the commands executed on a computer or other programmable equipment provide steps for realizing the functions designated by one or more processes in a flow chart and/or one or more blocks in a block diagram.

Although preferred embodiments of the present application have already been described, a person skilled in the art can make other modifications or revisions to these embodiments once he grasps the basic creative concept. Therefore, the attached claims are to be interpreted as including the preferred embodiments as well as all modifications and revisions falling within the scope of the present application. Obviously, a person skilled in the art can modify and vary the present application without departing from the spirit and scope of the present invention. Thus, if these modifications to and variations of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for generating processed web address information, comprising:
   one or more processors configured to:
   receive a request to share a webpage, wherein the request includes at least a first web address information associated with the webpage and user identification information associated with a first user;
generate a second web address information based at least in part on the first web address information and the user identification information associated with the first user;
present the second web address information;
receive an indication associated with an access by a second user to the second web address information;
in response to the indication, extract the user identification information associated with the first user from the second web address information;
determine whether the first user has a status of seller based at least in part on the user identification information associated with the first user, wherein to determine whether the first user has the status of seller includes to:
determine whether the first user is associated with a buyer's credit score greater than a preset threshold value; and
determine whether the first user is not associated with shop information associated with a website;
in the event that the first user does not have the status of seller, send a prompt message to the second user, wherein the prompt message includes a control to add the first user as a friend; and
in the event that the first user has the status of seller, omit sending a prompt message to the second user; and
one or more memories coupled to the one or more processors and configured to provide the one or more processors with instructions.

2. The system of claim 1, wherein the request further includes one or more of the following: time information and a digital signature.

3. The system of claim 1, wherein the second web address information is configured to be shareable by the first user.

4. The system of claim 1, wherein the request further includes a selection associated with a type of sharing.

5. The system of claim 4, wherein the one or more processors are further configured to share the second web address information based at least in part on the selection associated with the type of sharing.

6. The system of claim 1, wherein the one or more processors are further configured to determine whether the first user is associated with a status of buyer based at least in part on the user identification information associated with the first user.

7. The system of claim 1, wherein in the event that the control is activated, send a message to include the first user in a friends list associated with the second user.

8. The system of claim 1, wherein the second web address information includes a digital signature and wherein the one or more processors are further configured to extract the digital signature from the second web address information and perform verification on the digital signature based at least in part on the user identification information associated with the first user.

9. The system of claim 1, wherein the second web address information includes a time information and wherein the one or more processors are further configured to extract the time information from the second web address information and perform time verification on the time information based at least in part on a preset period of valid sharing time.

10. The system of claim 1, wherein the one or more processors are further configured to: prior to sending the prompt message to the second user:
retrieve a friends list associated with the second user; and
determine whether the first user is included in the friends list associated with the second user.

11. The system of claim 1, wherein the one or more processors are further configured to: prior to sending the prompt message to the second user:
retrieve user identification information associated with the second user; and
compare the user identification information associated with the second user to the user identification information associated with the first user.

12. The system of claim 1, wherein the one or more processors are further configured to:
retrieve a first name list, wherein the first name list includes identification information of users for which the second web address information has already been successfully activated;
determine an amount of add-friend prompt messages sent in connection with the second web address information; and
compare the amount of add-friend prompt messages sent in connection with the second web address information to a first preset threshold value.

13. The system of claim 1, wherein the one or more processors are further configured to:
retrieve a second name list, wherein the second name list includes identification information of users with whose published web address information the second user has already activated;
determine an amount of add-friend prompt messages sent in connection with the second user; and
compare the amount of add-friend prompt messages sent in connection with the second user to a second preset threshold value.

14. A method of generating processed web address information, comprising:
receiving a request to share a webpage, wherein the request includes at least a first web address information associated with the webpage and user identification information associated with a first user;
generating a second web address information based at least in part on the first web address information and the user identification information associated with the first user;
presenting the second web address information;
receiving an indication associated with an access by a second user to the second web address information;
in response to the indication, extracting the user identification information associated with the first user from the second web address information;
determining whether the first user has a status of seller based at least in part on the user identification information associated with the first user, wherein determining whether the first user has the status of seller includes:
determining whether the first user is associated with a buyer's credit score greater than a preset threshold value; and
determining whether the first user is not associated with shop information associated with a website;
in the event that the first user does not have the status of seller, sending a prompt message to the second user, wherein the prompt message includes a control to add the first user as a friend; and
in the event that the first user has the status of seller, omitting sending a prompt message to the second user.

15. The method of claim 14, wherein the second web address information is configured to be shareable by the first user.

16. The method of claim 14, wherein the request further includes a selection associated with a type of sharing.

17. The method of claim 16, further comprising sharing the second web address information based at least in part on the selection associated with the type of sharing.

18. The method of claim 14, further comprising determining whether the first user is associated with a status of buyer based at least in part on the user identification information associated with the first user.

19. The method of claim 14, wherein in the event that the control is activated, send a message to include the first user in a friends list associated with the second user.

20. The method of claim 14, wherein the second web address information includes a digital signature and further comprising extracting the digital signature from the second web address information and performing verification on the digital signature based at least in part on the user identification information associated with the first user.

21. The method of claim 14, wherein the second web address information includes a time information and further comprising extracting the time information from the second web address information and performing time verification on the time information based at least in part on a preset period of valid sharing time.

22. The method of claim 14, wherein prior to sending the prompt message to the second user, further comprising:
retrieving a friends list associated with the second user; and
determining whether the first user is included in the friends list associated with the second user.

23. The method of claim 14, wherein prior to sending the prompt message to the second user, further comprising:
retrieving user identification information associated with the second user; and
comparing the user identification information associated with the second user to the user identification information associated with the first user.

24. A non-transitory computer readable storage medium embodying a computer program product for generating processed web address information and comprising computer instructions for:
receiving a request to share a webpage, wherein the request includes at least a first web address information associated with the webpage and user identification information associated with a first user;
generating a second web address information based at least in part on the first web address information and the user identification information associated with the first user; presenting the second web address information;
receiving an indication associated with an access by a second user to the second web address information;
in response to the indication, extracting the user identification information associated with the first user from the second web address information;
determining whether the first user has a status of seller based at least in part on the user identification information associated with the first user, wherein determining whether the first user has the status of seller includes:
determining whether the first user is associated with a buyer's credit score greater than a preset threshold value: and
determining whether the first user is not associated with shop information associated with a website:
in the event that the first user does not have the status of seller, sending a prompt message to the second user, wherein the prompt message includes a control to add the first user as a friend; and
in the event that the first user has the status of seller, omitting sending a prompt message to the second user.

* * * * *